United States Patent [19]
Hester, Jr.

[11] 3,880,878
[45] Apr. 29, 1975

[54] 1-AMINOALKYL-6-PHENYL-4H-S-TRIAZOLO-[4,3-][1,3,4]BENZOTRIAZEPINES

[75] Inventor: Jackson B. Hester, Jr., Galesburg, Mich.

[73] Assignee: The Upjohn Company, Kalamazoo, Mich.

[22] Filed: Jan. 21, 1974

[21] Appl. No.: 434,811

[52] U.S. Cl............ 260/308 R; 71/92; 260/247.1 E; 260/247.5 E; 260/256.4 Q; 260/293.69; 260/562 R; 260/570 AB; 424/248; 424/250; 424/267; 424/269
[51] Int. Cl.. C07d 57/02; C07d 57/04; C07d 99/02
[58] Field of Search..... 260/308 R, 268 TR, 293.59, 260/247.5 EP

[56] References Cited
OTHER PUBLICATIONS
Bowie et al., Chem. Abstracts, Vol. 77, Abstract, No. 88421m (1972), QD1A51.

Primary Examiner—Alton D. Rollins
Attorney, Agent, or Firm—Hans L. Berneis

[57] ABSTRACT
Compounds of the Formula IV C

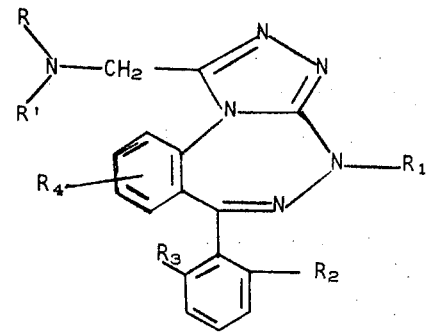

IV C wherein R is hydrogen or alkyl of 1 to 3 carbon atoms inclusive; wherein R' is alkyl as defined above; or together

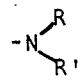

is pyrrolidino, piperidino, morpholino, or 4-methylpiperazino; wherein $R_1$ is hydrogen or alkyl defined as above; wherein $R_2$ and $R_3$ are hydrogen, chloro or fluoro; and wherein $R_4$ is hydrogen, chloro or nitro, are prepared by a multistep reaction from compounds of the formula I

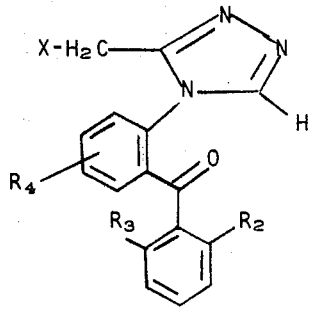

wherein X is chlorine or bromine, and $R_2$, $R_3$, $R_4$ are defined as above.

The compounds of formula IV C and their pharmacologically acceptable acid addition salts have anti-convulsant and muscle relaxing activities in mammals.

9 Claims, No Drawings

1-AMINOALKYL-6-PHENYL-4H-S-TRIAZOLO-[4,3-][1,3,4]BENZOTRIAZEPINES

BACKGROUND OF THE INVENTION

FIELD OF THE INVENTION

This invention is directed to new organic compounds and is particularly concerned with novel 1-substituted-6-phenyl-4H-s-triazolo-[4,3-a][1,3,4]benzotriazepines and a process for the production thereof and intermediates therefor.

The novel compounds and the process of production therefor can be illustratively represented as follows:

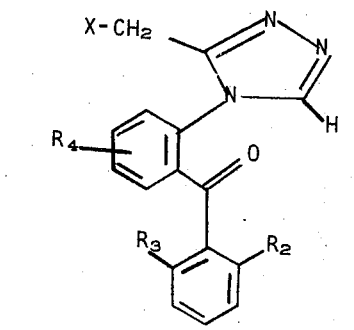

I

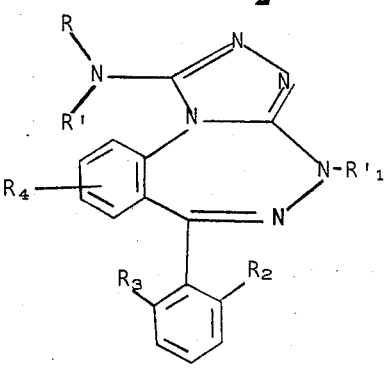

IV B

II

Wherein X and $X_1$ are chloro or bromo; wherein R is hydrogen or alkyl of 1 to 3 carbon atoms, inclusive; wherein R' is alkyl as defined above, or together $$-N\diagup{R \atop R'}$$

is pyrrolidino, piperdino, morpholino or 4-methylpiperazino.

Wherein $R'_1$ is alkyl defined as above; wherein $R_2$ and $R_3$ are hydrogen, chloro or fluoro, and wherein $R_4$ is hydrogen, chloro or nitro.

The invention further embraces the pharmacologically acceptable acid addition salts of Compounds IV C (including IV A and IV B.)

The more desirable products of this invention have the formula IV D:

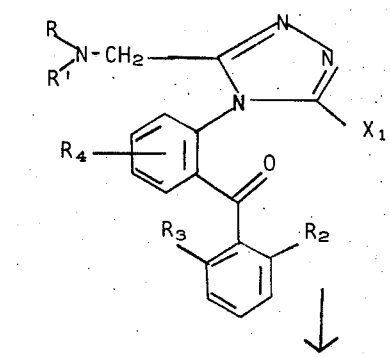

III

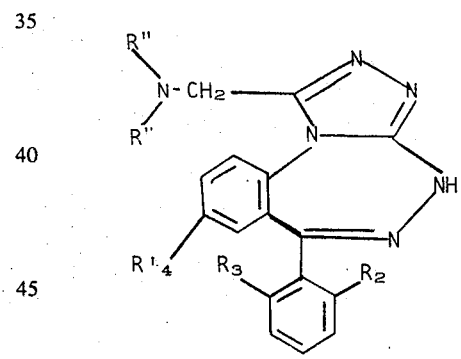

IV D wherein R'' is alkyl of 1 to 3 carbon atoms inclusive; wherein $R_2$ and $R_3$ are hydrogen, chloro, or fluoro; and wherein $R'_4$ is chloro or nitro, and the pharmacologically acceptable acid addition salts thereof.

The most desirable product of this invention has the Formula IV E:

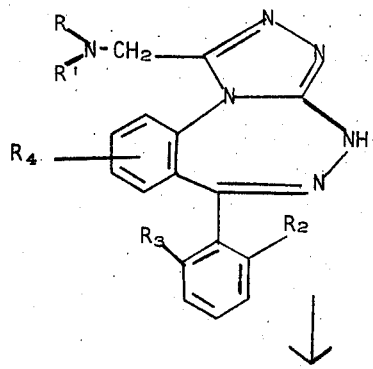

IV A

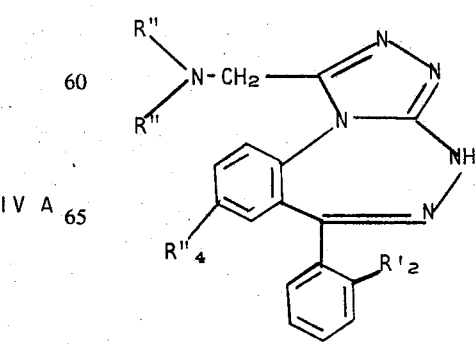

IV E wherein R″ is alkyl of 1 to 3 carbon atoms, inclusive; wherein R′₂ is hydrogen or chloro; and wherein R″₄ is chloro or nitro, and the pharmacologically acceptable acid addition salts thereof.

The process of this invention comprises: Heating of 60°–80° C. a compound of formula I with an N-bromo or N-chloro-acid amide or -acid imide to obtain Compound II; treating, preferably at 20°–50° C., in the presence of a catalyst, Compound II with a primary or secondary amine of the formula

wherein R and R′ are defined as hereinabove, to obtain Compound III, and heating between 70°–120° C Compound III with anhydrous hydrazine or a hydrazine salt, and base, to obtain Compound IV A. If desired, compound IV A can be alkylated in conventional manner with an alkali metal hydride or alkoxide, and an alkyl halide to give the Compounds IV B.

DESCRIPTION OF THE PREFERRED EMBODIMENT

Lower alkyl groups of 1 to 3 carbon atoms, inclusive, are exemplified by methyl, ethyl, propyl and isopropyl.

The novel compounds of the formula IV C (comprising IV A, IV B) including acid addition salts thereof have anti-convulsant, anti-spasmodic, and muscle-relaxant effects in mammals and birds.

The acid addition salts of compounds of formula IV C contemplated in this invention, are the hydrochlorides, hydrobromides, hydriodides, sulfates, phosphates, cyclohexanesulfamates, methanesulfonates and the like, prepared by reacting a compound of formula IV C with the stoichiometrically calculated amount of the selected pharmacologically acceptable acid.

8-Chloro-1-[(dimethylamino)methyl]-6-phenyl-4H-s-triazolo-[4,3-a][1,3,4]benzotriazepine was tested by the following tests in mice:

Chimney test: [Med. Exp. 4, 145 (1961)]: The test determines the ability of mice to back up and out of a vertical glass cylinder within 30 seconds. At the effective dosage, 50% of the mice failed doing it.

Nicotine antagonism test: Mice in a group of 6 are injected with the test compound. Thirty minutes later the mice, including control (untreated) mice, are injected with nicotine salicylate (2 mg./kg.). The control mice show overstimulation, i.e., (1) running convulsions followed by (2) tonic extensor fits; followed by (3) death. The ED₅₀ for (2) and (3) are determined.

The pharmaceutical forms contemplated by this invention include pharmaceutical compositions suited for oral, parenteral and rectal use, e.g., tablets, powder packets, cachets, dragees, capsules, solutions, suspensions, sterile injectable forms, suppositories, bougies, and the like. Suitable diluents or carriers such as carbohydrates (lactose), proteins, lipids, calcium phosphate, cornstarch, stearic acid, methylcellulose and the like may be used as carriers or for coating purposes. Water and oil, e.g., coconut oil, sesame oil, safflower oil, cottonseed oil, peanut oil, may be used for preparing solutions or suspensions of the active drug. Sweetening, coloring and flavoring agents may be added.

For mammals and birds, food premixes with starch, oatmeal, dried fishmeat, fishmeal, flour and the like can be prepared.

As tranquilizer the compounds of formula IV (A, B and C) can be used in dosages of 1–20 mg./kg. in oral or injectable preparations as described above, to alleviate tension and anxiety in mammals or birds, such as e.g. occurs when animals are transported. For mammals of 10 kg. or more, the smaller dosage range is preferable.

Other acid addition salts of the compounds of formula IV C can be made, such as the fluosilicic acid addition salts, which are useful mothproofing compounds, or the trichloroacetates useful as herbicides against Johnson grass, Bermuda grass, yellow foxtail and green foxtail, and quack grass.

The starting materials of formula I of this invention, substituted or unsubstituted 2-(3-halomethyl)-4H-1,2,4-triazol-4-yl benzophenones are prepared as described in the Preparations.

In carrying out the process of this invention, a selected 2-(3-halomethyl-4H-1,2,4-triazol-4-yl)benzophenone I is reacted with a halogenating agent, e.g., an N-halo-acid amide or-acid imide, preferably at 60°–80° C. in an inert organic solvent. Carbon tetrachloride, chloroform, benzene, methylene, chloride, ethylene dichloride or the like, are preferred as solvents. The halogenating agents used in this reaction are in particular N-bromo- and N-chlorosuccinimide, N-bromoacetamide, and N-chloroacetamide. The reaction period is between 1 to 6 hours. After termination of the reaction, the halogenated compound II is recovered and purified by conventional procedures, e.g., extraction, chromatography, and crystallization.

Compound II is then reacted with a secondary amine

defined as above. This reaction is preferably carried out in the presence of potassium iodide as catalyst, and in a solvent, e.g., methanol, ethanol, tetrahydrofuran, dioxane, dimethylformamide, and the like, at 20°–50° C., over a period of 1 to 24 hours. Compound III, thus obtained, is recovered and purified by conventional procedures, such as extraction, chromatography, crystallization and the like.

Compound III is then cyclized with anhydrous hydrazine, or a hydrazine salt and a base in an inert organic solvent. As hydrazine salt the hydrochloride or sulfate are usually used, and as base, sodium carbonate, potassium carbonate or sodium or potassium acetate are preferred. The reaction is preferably carried out between 70°–120° C., in a solvent such as methanol, propanol, 1-butanol, dioxane, dimethylsulfoxide and the like. The reaction period required is from 1 to 7 days. Thereafter the product IV A thus obtained is isolated and purified by conventional procedures, e.g., extraction, crystallization, chromatography, and the like.

Compound IV A, if desired, is alkylated in conventional manner to give compound IV B. For this alkylation compound IV A is treated at 0° to 100° C., with a base, e.g., an alkali metal hydride, alkoxide or amide, such as sodium or potassium hydride, sodium or potassium ethoxide, sodamide or the like, in an inert organic solvent. Dimethylformamide, dimethylacetamide, benzene, dimethylsulfoxide, methanol, ethanol, 1- or 2-propanol, 1- or 2-butanol, tetrahydrofuran, or the like, are useful inert organic solvents for this reaction. After 30 to 60 minutes, the alkyl halide is added. For this reaction step 1 to 24 hours are needed. The thus produced compound IV B is recovered and purified by conventional means such as extraction, crystallization, and chromatography.

The following examples are illustrative of the processes and products of the present invention, but are not to be construed as limiting.

PREPARATION 1

5-chloro-2-formamidobenzophenone 34.7 g. of 2-amino-5-chlorobenzophenone in 100 ml. of formic is refluxed for 1.5 hours. The formic acid is distilled off under reduced pressure and the residue is dissolved in 300 ml. of ethyl acetate. The solution is washed with a saturated aqueous solution of sodium hydrogen carbonate and water in that order, dried over anhydrous sodium sulfate, and distilled to remove the solvent. The residue is treated with n-hexane to give 5-chloro-2-formamidobenzophenone as pale yellowish crystals. Recrystallization from ethanol gives pale yellowish granular crystals of melting point 92.5°–93° C.

PREPARATION 2

3-Amino-6-chloro-3,4-dihydro-4-hydroxy-4-phenykquinazoline

To 2.7 g. of 5-chloro-2-formamidobenzophenone in 40 ml. ethanol is added 2.5 ml. of hydrazine hydrate. The mixture is kept at reflux for 20 minutes and then cooled. The resulting crystals are recovered by filtration and washed with ethanol and ether in that order. The above procedure gives crystals of 3-amino-6-chloro-3,4-dihydro-4-hydroxy-4-phenylquinazoline of melting point 189°–192° C.

PREPARATION 3

5,2'-Dichloro-2-formamidobenzophenone

A solution of 1.33 g. of 2-amino-2',5-dichlorobenzophenone in 3.34 ml. of 88% formic acid was refluxed, under nitrogen, for 3 hours. The cooled reaction mixture was mixed with ethyl acetate and washed successively with aqueous sodium bicarbonate and water. The ethyl acetate solution was dried over anhydrous sodium sulfate and concentrated. Crystallization of the residue from ethanol-water gave: 0.685 g. of 5,2'-dichloro-2-formamidobenzophenone of melting point 107.5°–110° C., and in two additional crops 0.11 g. of melting point 107°–110° C. and 0.21 g. of melting point 106°–108° C.

PREPARATION 4

3-Amino-6-chloro-4-(o-chlorophenyl)-3,4-dihydro-4-hydroxyquinazoline.

A solution of 1.00 g. of 5,2'-dichloro-2-formamidobenzophenone (0.0034 mole) in 15 ml. of ethane was treated with 1.0 ml. of hydrazine hydrate, refluxed, under nitrogen, for 35 minutes, coated in an ice bath and filtered. The solid was washed successively with ethanol and diethylether to give 0.47 g. of 3-amino-6-chloro-4-(o-chlorophenyl)-3,4-dihydro-4-hydroxyquinazoline of melting point 195°–202° C.

PREPARATION 5

2-ethoxymethyleneamino-5-nitrobenzophenone

To 24.2 g. of 2-amino-5-nitrobenzophenone, is added 165 ml. of triethyl orthoformate and 18 ml. of acetic acid. While stirring, the mixture is heated to 130°–140° C. for 2.5 hours. The excess ortho-ester and acetic acid are removed by distillation in vacuo to give 2-ethoxymethyleneamino-5-nitrobenzophenone as an oily product.

PREPARATION 6

3-amino-3,4-dihydro-4-hydroxy-6-nitro-4-phenylquinazoline

2-Ethoxymethyleneamino-5-nitrobenzophenone, as obtained in Preparation 5, is dissolved in 200 ml. of ethanol, and treated with 25 ml. of hydrazine hydrate (100%). The mixture is allowed to stand at room temperature for about 3 hours, and the resulting precipitate is recovered by filtration. Crystals of 3-amino-3,4-dihydro-4-hydroxy-6-nitro-4-phenylquinazoline are obtained. Recrystallization from chloroform-methanol yields yellow needles of melting point 184°–185° C.

In the same manner given in the preceding examples, other 3-amino-3,4-dihydro-4-hydroxy-4-phenylquinazolines are obtained. Representative compounds thus obtained include: 3-amino-3,4-dihydro-4-hydroxy-6-nitro-4-phenyl) quinazoline and 3-amino-3,4-dihydro-4-hydroxy-6-chloro-4-(2,6-difluorophenyl)quinazoline; 3-amino-4-(2-chlorophenyl)-3,4-dihydro-4-hydroxyquinazoline.

PREPARATION 7

5-chloro-2-[3-(Chloromethyl)-4H-1,2,4-triazol-4-yl]benzophenone

A stirred mixture of 3-amino-6-chloro-3,4-dihydro-4-hydroxy-4-phenylquinazoline [M. E. Derieg, et al., J. Org. Chem. 36, 781 (1971)] (54.8 g. 0.2 mole), sodium carbonate (60 g, 0.566 mole), water (480 ml.) and chloroform (480 ml.) is cooled in a salt-ice bath and treated dropwise with chloroacetyl chloride (71.76 g., 0.63 mole) at such a rate that the temperature of the reaction mixture does not exceed 10° C. The addition requires 30 minutes. The mixture is stirred for an additional 20 minutes and the resulting solid is collected by filtration, washed with water and chloroform, and dried in vacuo to give 72.9 g. of product of melting point 160°–162° C. This material is mixed with acetic acid (600 ml.) and refluxed under nitrogen for 1.5 hours. The mixture is concentrated in vacuo, and the residue is mixed with aqueous sodium bicarbonate and extracted with methylene chloride. The extract is washed, dried and concentrated. The residue is chromatographed on silica gel (3 kg.) with 5% methanol-95% chloroform, to give 19.3 g. of 5-chloro-2-(3-chloromethyl-4H-1,2,4-triazol-4-yl)benzophenone of melting point 75°–105° C.

PREPARATION 8

5-nitro-2-(3-dichloromethyl-4H-1,2,4-triazol-4-yl)benzophenone

To 125 ml. of chloroform, there is added 14.2 g. of 3-amino-3,4-dihydro-4-hydroxy-6-nitro-4-phenylquinazoline, followed by the addition of a solution of 15 g. sodium carbonate in 125 ml. water. The stirred mixture is cooled in a salt-ice bath and treated with 12.5 ml. of chloroacetyl chloride dropwise over 20 minutes. The mixture is further stirred for 30 minutes and the resulting crystals are recovered by filtration, washed with water and chloroform, and finally dried, to give the intermediate di(chloroacetyl) derivative. Recrystallization from acetone-benzene gave product of melting point 136°–137° C.

To 200 ml. of dry benzene is added 12 g. of the di(chloracetyl) derivative above, followed by the addition of 8.4 g. monochloracetic acid. This mixture is stirred at room temperature for 20 hours. The reaction mixture is neutralized with a saturated aqueous solution of sodium hydrogen carbonate and the resulting crystals are recovered by filtration, washed with water and benzene and finally dried, to give crystals of 5-nitro-2-(3-chloromethyl-4H-1,2,4-triazol-4-yl) benzophenone. Recrystallization from ethyl acetate yields the product as colorless needles of melting point 143° – 144° C.

PREPARATION 9

2′,5-dichloro-2-(3-chloroethyl-4H-1,2,4-triazol-4-yl) benzophenone

To a solution of 6.5 g. of 3-amino-6-chloro-3,4-dihydro-4-hydroxy-4-(o-chlorophenyl)quinazoline in 63 ml. of chloroform is added 4.64 g. of sodium carbonate in 63 ml. of water. The mixture is stirred, cooled to 0°–5° C. and treated with 6.75 ml. of chloroacetyl chloride, dropwise at a temperature not exceeding 10° C. After the dropwise addition is completed, the mixture is stirred for another hour and the resulting crystals are recovered by filtration, washed with water and dried, to give the di(chloroacetyl) derivative. Recrystallization from acetone yields this compound as colorless crystals of melting point 157°–158° C. (effervescence).

To 50 ml. of dry benzene is added 2.3 g. of the di-(chloroacetyl) derivative prepared above, followed by the addition of 0.7 g. monochloroacetic acid. The mixture is refluxed for 2 hours. After cooling, the reaction mixture is neutralized with an aqueous solution of sodium hydrogen carbonate and the benzene layer is separated. The benzene layer is washed with water, dried over anhydrous sodium sulfate, and distilled to remove the solvent. The residue is treated with ether, whereupon crystals of 2′5-dichloro-2-(3-chloromethyl-4H-1,2,4-triazol-4-yl)benzophenone are obtained. Recrystallization from chloroform-n-hexane gives colorless granules of melting point 139°–140° C.

In the manner given in the preceding examples, other starting compounds of formula I can be synthesized. Representative compounds, thus obtained, included:
5-chloro-2′6′-difluoro-2-(3-chloromethyl-4H-1,2,4-triazol-4-yl)-benzophenone;
3-chloro-2-(3-chloromethyl-4H-1,2,4-triazol-4-yl)-benzophenone;
4-chloro-2-(3-chloromethyl-4H-1,2,4-triazol-4-yl)-benzophenone;
2′-chloro-2-(3-chloromethyl-4H-1,2,4-triazol-4-yl)-benzophenone;
2′-chloro-5-nitro-2-(3-chloromethyl-4H-1,2,4-triazol-4-yl)-benzophenone;
2′-chloro-6-nitro-2-(3-chloromethyl-4H-1,2,4-triazol-4-yl)-benzophenone;
and the like.

EXAMPLE 1

5-chloro-2-(3-chloromethyl-5-bromo-4H-1,2,4-triazol-4-yl)benzophenone

A stirred mixture of 5-chloro-2-(3-chloromethyl-4H-1,2,4-triazol-4-yl)-benzophenone (18.9 g., 0.057 mole), N-bromosuccinimide (11.9 g., 0.0684 mole) and carbon tetrachloride (1 l.) was refluxed for 4 hours and concentrated. The residue was mixed with water and extracted with chloroform. The extract was washed with water, dried over anhydrous sodium sulfate, and concentrated. The residue was chromatographed on silica gel (2 kg.) with 2.5% methanol-97.5% chloroform. This mixture of starting material and product, which was obtained, was dissolved in carbon tetrachloride (300 ml.), treated with N-bromosuccinimide (4.0 g.) and refluxed for 2 hours. The mixture was concentrated in vacuo, and the residue mixed with water and extracted with methylene chloride. The extract was washed with water, dried over anhydrous sodium sulfate, concentrated, and the residue chromatographed on silica gel (2kg.) with 2% methanol -98% chloroform. The product thus obtained was crystallized from ethyl acetate Skellysolve B hexanes to give in 2 crops: 3.34 g. of 5-chloro-2-(3-chloromethyl-5-bromo-4H-1,2,4-triazol-4-yl)benzophenone of melting point 142°–144° C., and 2.51 g. of melting point 137°–140° C. The analytical sample had melting point of 141°–144° C.

Anal. Calcd. for $C_{16}H_{10}BrCl_2N_3O$: C, 46.75; H, 2.45; Br, 19.44; Cl, 17.25; N, 10.22

Found: C, 47.14; H, 2.50; Br, 19.49; Cl, 17.16; N, 10.46

EXAMPLE 2

5-Chloro-2-[3-[(dimethylamino)methyl]-5-bromo-4H-1,2,4-triazol-4-yl]-benzophenone A stirred mixture of 5-chloro-2-(3-chloromethyl-5-bromo-4H-1,2,4-triazol-4-yl) benzophenone (4.11 g., 0.01 mole), potassium iodide (3.32 g., 0.02 mole) and tetrahydrofuran (200 ml) was treated with a solution of dimethylamine (9.5 g.) in methanol (25 ml.), and the resulting mixture was kept under nitrogen at ambient temperature (25° C.) for 18 hours and concentrated in vacuo. The residue was mixed with water and extracted with methylene chloride. The extract was washed with water, dried over anhydrous sodium sulfate, and concentrated. The residue was dissolved in methanol-ethyl acetate, decolorized with activated charcoal (Darco G 60) and crystallized to give 5-chloro-2-[3-[(dimethylamino)methyl]-5-bromo-4H-1,2,4-triazol-4-yl]benzophenone in two crops: 2.68 g. of melting point 173°–176° C. and 0.56 g. of melting point 168°–171.5° C.

EXAMPLE 3

8-Chloro-1-[(dimethylamino)methyl]-6-phenyl-4H-s-triazolo[4,3-a][1,3,4]-benzotriazepine A stirred mixture of 5-chloro-2-[3-[(dimethylamino)methyl]-5-bromo-4H-1,2,4-triazol-4-yl]benzophenone (0.42 g., 0.001 mole), hydrazine sulfate (0.39 g., 0.003 mole), sodium acetate (0.67 g., 0.007 mole) and absolute ethanol (15 ml.) was refluxed, under nitrogen, for 7 days. The mixture was concentrated and the residue was mixed with water and extracted with methylene chloride. The extract was washed with water, dried over anhydrous sodium sulfate, and concentrated. The residue was chromatographed on silica gel (40 g.) with 2.5% methanol-97.5% chloroform. The product thus obtained was crystallized from methylene chloride, ethyl acetate and Skellysolve B hexanes to give 80 mg. of 8-chloro-1-[(dimethylamino)methyl]-6-phenyl-4H-s-triazolo[4,3-a][1,3,4]-benzotriazepine, of melting point 226°–228.5° C.

Anal. Calcd. for $C_{18}H_{17}ClN_6$: C, 61.27; H, 4.86; Cl, 10.05; N, 23.82

A solution of 8-chloro-1-[(dimethylamino)methyl]-6-phenyl-4H-s-triazolo[4,3-a][1,3,4]benzotriazepine (0.001 mole) in dimethyl formanide (stirred Found: C, 61.34; H, 4.90; Cl, 10.19; N, 24.05

EXAMPLE 4

8-chloro-1-[dimethylamino)methyl]-4-methyl-6-phenyl-4H-s-triazolo[4,3-a][1,3,4]benzotriazepine (0.001 mole) in dimethylformamide (25 ml.) is treated at 25° C. with 0.0011 mole of a 57% mineral oil suspension of sodium hydride. The mixture is sirred for 30 minutes and methyl iodide is then added to the mixture. The reaction mixture is stirred for 2 hours, poured into excess water and extracted with methylene chloride. The extract is washed with brine, dried with anhydrous sodium sulfate and concentrated. The residue is crystallized from methanol ethyl acetate-Skellysolve B hexanes to give 8-chloro-1-[(dimethylamino)methyl]-4-methyl-6-phenyl-4H-s-triazolo[4,3-a][1,3,4]benzotriazepine

EXAMPLE 5

5-Nitro-2-(3-chloromethyl-5-chloro-4H-1,2,4-triazol-4-yl)benzophenone.

In the manner given in Example 1, 5-nitro-2-(3-chloromethyl-4H-1,2,4-triazol-4-yl)benzophenone in benzene is refluxed with N-chlorosuccimimide to give 5-nitro-2-(3-chloromethyl-5-chloro-4H-1,2,4-triazol-4-yl)benzophenone

EXAMPLE 6

5-Nitro-2-[3-[(dimethylamino)-methyl]5-chloro-4H-1,2,4-triazol-4-yl]benzophenone In the manner given in Example 2, 5-nitro-2-[(3-chloromethyl-5-chloro-4H-1,2,4-triazol-4-yl]benzophenone, potassium iodide, and dimethylamine in tetrahydrofuran were allowed to react at room temperature for 20 hours to give 5-nitro-2-[3-[(dimethylamino)methyl]-5-chloro-4H-1,2,4-triazol-4-yl]benzophenone

EXAMPLE 7

8-nitro-1-[(dimethylamino)methyl]-6-phenyl-4H-s-triazolo[4,3-a][1,3]4]benzotriazepine In the manner given in Example 3, 5-nitro-2-[3-[(dimethylamino)methyl]-5-chloro-4H-1,2,4-triazol-4-yl]benzophenone is heated with hydraxine (anhydrous) in ethanol to give 8-nitro-1-[(dimethylamino)methyl]-6-phenyl-4H-s-triazolo[4,3-a][1,3,4]benzotriazepine

EXAMPLE 8

4-ethyl-8-nitro-1-[(dimethylamino)methyl]-6-phenyl-4H-s-triazolo-[4,3-a][1,3,4]benzotriazepine In the manner given in Example 4, 8-nitro-1-[(dimethylamino)methyl]-6-phenyl-4H-s-triazolo[4,3-a][1,3,4]benzotriazepine was treated with sodium ethoxide and thereafter with ethyl iodide to give 4-ethyl-8-nitro-1-[(dimethylamino)methyl]-6-phenyl-4H-s-triazolo[4,3-a][1,3,4]benzotriazepine.

EXAMPLE 9

2',5-dichloro-2-(3-chloromethyl-5-bromo-4H-1,2,4-triazol-4-yl)benzophenone.

In the manner given in Example 1, 2',5-dichloro-2-(3-chloromethyl-4H-1,2,4-triazol-4-yl)benzophenone in carbon tetrachloride is refluxed with N-bromosuccinimide to give 2',5-dichloro-2-(3-chloromethyl-5-bromo-4H-1,2,4-triazol-4-yl)benzophenone

EXAMPLE 10

2'5-Dichloro-2-[3-[(dimethylamino)methyl]-5-bromo-4H-1,2,4-triazol-4-yl]benzophenone, potassium iodide, and dimethylamine in ethanol were treated together at room temperature for 20 hours to give 2',5-dichloro-2-[3-[(dimethylamino)methyl]-5-bromo-4H-1,2,4-triazol-4-yl]benzophenone

EXAMPLE 11

8-chloro-1-[(dimethylamino)methyl]-6-(o-chlorophenyl)-4H-s-triazolo[4,3-a][1,3,4]-benzotriazepine In the manner given in Example 3, 2',5-dichloro-2-[3-[(dimethylamino)methyl]-5-bromo-4H-1,2,4-triazol-4-yl]benzophenone is heated with hydrazine (hydrazine chloride and sodium acetate) in ethanol to give 8-chloro-1-[(dimethylamino)methyl]-6-(o-chlorophenyl)-4H-s-triazolo[4,3-a][1,3,4]benzotriazepine.

EXAMPLE 12

8-chloro-4-propyl-1-[(dimethylamino)methyl]-6-(o-chlorophenyl)-4H-s-triazolo[4,3-a][1,3,4]benzotriazepine.

In the manner given in Example 4, 8-chloro-1-[(dimethylamino)methyl]-6-(o-chlorophenyl)-4H-s-triazolo[4,3-a][1,3,4]benzotriazepine in dimethylformamide was treated with sodium hydride, and thereafter with propyl iodide to give 8-chloro-4-propyl-1-[(dimethylamino)methyl]-6-(o-chlorophenyl)-4H-s-triazolo[4,3-a]-[1,3,4]benzotriazepine.

EXAMPLE 13

5-chloro-2',6'-difluoro-2-(3-chloromethyl-5-bromo-4H-1,2,4-triazol-4-yl)benzophenone In the manner given in Example 1, 5-chloro-2',6'-difluoro-2-(3-chloromethyl-4H-1,2,4-triazol-4-yl)benzophenone in benzene is refluxed with N-bromosuccimimide to give 5-chloro-2',6'-difluoro-2-(3-chloromethyl-5-bromo-4H-1,2,4-triazol-4-yl)benzophenone.

EXAMPLE 14

5-chloro-2',6'-difluoro-2-[3-[(dimethylamino)methyl]-5-bromo-4H-1,2,4-triazol-4-yl]benzophenone In the manner given in Example 2, 5-chloro-2',6'-difluoro-2-(3-chloromethyl-5-bromo-4H-1,2,4-triazol-4-yl)-benzophenone, potassium iodide, and dimethylamine in tetra-hydrofuran were treated together at room temperature for 20 hours to give 5-chloro-2',6'-difluoro-2-[3-(dimethylamino)methyl]-5-bromo-4H-1,2,4-triazol-4-yl)benzophenone

EXAMPLE 15

8-chloro-1-[(dimethylamino)methyl-6-(2,6-difluorophenyl)-4H-s-triazolo[4,3-a][1,3,4]benzotriazepine.

In the manner given in Example 3, 5-chloro-2',6'-difluoro-2-[3-[(dimethylamino)methyl]-5-bromo-4H-1,2,4-triazol-4-yl]-2-benzophenone is heated with anhydrous hydrazine in ethanol to give 8-chloro-1-[(dimethylamino)methyl]-6-(2,6-difluorophenyl)-4H-s-triazolo[4,3-a][1,3,4]benzotriazepine.

EXAMPLE 16

4-Methyl-8-chloro-1-[(dimethylamino)methyl]-6-(2,6-difluorophenyl)-4H-s-triazolo[4,3-a][1,3,4]benzotriazepine.

In the manner given in Example 4, 8-chloro-1-[(dimethylamino)methyl]-6-(2,6-difluorophenyl)-4H-s-triazolo[4,3-a][1,3,4]-benzotriazepine was treated with sodium hydride and thereafter with methyl bromide to give 4-methyl-8-chloro-1-[(dimethylamino)methyl]-6-(2,6-difluorophenyl)-4H-s-triazolo-[4,3-a][1,3,4]benzotriazepine.

EXAMPLE 17

2'-chloro-2-(3-chloromethyl-5-bromo-4H-1,2,4-triazol-4-yl)benzophenone

In the manner given in Example 1, 2'-chloro-2-[3-chloromethyl-4H-1,2,4-triazol-4-yl]benzophenone in carbon tetrachloride is refluxed with N-bromosuccimimide to give 2'-chloro-2-(3-chloromethyl-5-bromo-4H-1,3,4-triazol-4-yl)benzophenone.

EXAMPLE 18

2'-chloro-2-[3-(pyrrolidinomethyl)-5-bromo-4H-1,2,4-triazol-4-yl]benzophenone

In the manner given in Example 2, 2'-chloro-2-(3-chloromethyl-5-bromo-4H-1,2,4-triazol-4-yl)benzophenone, potassium iodide, and pyrrolidine in methanol are treated together at room temperature for 24 hours to give 2'-chloro-2-[3-(pyrrolidinomethyl)-5-bromo-4H-1,2,4-triazol-4-yl]benzophenone.

EXAMPLE 19

1-(pyrrolidinomethyl)-6-(o-chlorophenyl)-4H-s-triazolo[4,3-a][1,3,4]benzotriazepine In the manner given in Example 3, 2'-chloro-2-[3-(pyrrolidinomethyl)-5-bromo-4H-1,2,4-triazol-4-yl]benzophenone is heated with anhydrous hydrazine in ethanol to give 1-(pyrrolidinomethyl)-6-(o-chlorophenyl)-4H-s-triazolo[4,3-a][1,3,4]benzotriazepine.

EXAMPLE 20

2'-chloro-5-nitro-2-(3-chloromethyl-5-bromo-4H-1,2,4-triazol-4-yl)benzophenone

In the manner given in Example 1, 2'-chloro-5-nitro-2-(3-chloromethyl-4H-1,2,4-triazol-4-yl)benzophenone in chloroform is refluxed with N-bromoacetamide to give 2'-chloro-5-nitro-2-(3-chloromethyl-5-bromo-4H-1,2,4-triazol-4-yl)benzophenone.

EXAMPLE 21

2'-chloro-5-nitro-2-[3-(piperidinomethyl)-5-bromo-4H-1,2,4-triazol-4-yl]benzophenone In the manner given in Example 2, 2'-chloro-5-nitro-2-(3-chloromethyl-5-bromo-4H-1,2,4-triazol-4-vl)benzophenone, potassium iodide and piperidine in ethanol are treated together at room temperature for 20 hours to give 2'-chloro-5-nitro-2-[3-(piperidinomethyl)-5-bromo-4H-1,2,4-triazol-4-yl]benzophenone.

EXAMPLE 22

1-(piperidonomethyl)-6-(chlorophenyl)-8-nitro-4H-s-triazolo[4,3-a][1,3,4]benzotriazepine In the manner given in Example 3, 2'-chloro-5-nitro-2-[3-(piperidinomethyl)-5-bromo-4H-1,2,4-triazol-4-yl]benzophenone is heated with hydrazine sulfate and potassium acetate in ethanol to give 1-(piperidonomethyl)-6-(chlorophenyl)-8-nitro-4H-s-triazolo[4,3-a][1,3,4]benzotriazepine.

EXAMPLE 23

5-chloro-2-[3-[(4-methylpiperazino)methyl]-5-bromo-4H-1,2,4-triazol-4-yl]benzophenone In the manner given in Example 2, 5-chloro-2-(3-chloromethyl-5-bromo-4H-1,2,4-triazol-4-yl)benzophenone, potassium iodide, and 4-methylpiperazine in methanol were treated together at room temperature for 24 hours to give 5-chloro-2-[3-[(4-methylpiperazino)methyl]-5-bromo-4H-1,2,4-triazol-4-yl]benzophenone.

EXAMPLE 24

8-chloro-1-[(4-methylpiperazino)methyl]-6-phenyl-4H-s-triazolo[4,3-a][1,3,4]benzotriazepine In the manner given in Example 3, 5-chloro-2-[3-[(4-methylpiperazino)methyl]-5-bromo-4H-1,2,4-triazol-4-yl]benezephenone is heated with anhydrous hydrazine in ethanol to give 8-chloro-1-[(4-methylpiperazino)methyl]-6-phenyl-4H-s-triazolo[4,3-a][1,3,4]benzotriazepine.

In the manner given in the prior examples, other compounds corresponding to formula IV C can be prepared. Representative examples, thus obtained, include:

8-chloro-1-(morpholinomethyl)-6-phenyl-4H-s-triazolo-[4,3-a][1,3,4]benzotriazepine;
8-chloro-1-(morpholinomethyl)-6-(o-chlorophenyl)-4H-s-triazolo[4,3-a][1,3,4]benzotriazepine;
8-chloro-1-(piperidinomethyl)-6-(o-chlorophenyl)-4H-s-triazolo[4,3-a][1,3,4]benzotriazepine
7-chloro-1-(pyrrolidinomethyl)-6-phenyl-4H-s-triazolo-[4,3-a][1,3,4]benzotriazepine
9-chloro-1-[(4-methylpiperazino) methyl]-6-phenyl-4H-s-triazolo[4,3-a][1,3,4]benzotriazepine
10-chloro-1-[(diethylamino)methyl]-6-phenyl-4H-s-triazolo[4,3-a][1,3,4]benzotriazepine
8-nitro-1-[(dipropylamino)methyl]-6-phenyl-4H-s-triazolo-[4,3-a][1,3,4]benzotriazepine
8-nitro-1-(morpholinomethyl)-6-(o-chlorophenyl-4H-s-triazolo[4,3-a][1,3,4]benzotriazepine
9-nitro-1-[(diethylamino)methyl]-6-(o-fluorophenyl)-4H-s-triazolo[4,3-a][1,3,4]benzotriazepine
10-nitro-1-[(dimethylamino)methyl]-6-(2,6-difluorophenyl)-4H-s-triazolo[4,3-a][1,3,4]benzotriazepine
1-(piperdinomethyl)-6-(o-fluorophenyl)-4H-s-triazolo-[4,3-a][1,3,4]benzotriazepine
1-(pyrrolidinomethyl)-6-phenyl-4H-s-triazolo[4,3-a]-[1,3,4]benzotriazepine
8-chloro-1-[(ethylamino) methyl]-6-(o-fluorophenyl)-4H-s-triazolo[4,3-a][1,3,4]benzotriazepine
8-chloro-1-[(dimethylamino)methyl]-4-methyl-6-(o-chlorophenyl)-4H-s-triazolo[4,3-a][1,3,4]benzotriazepine
1-[(dimethylamino)methyl]-6-(o-chlorophenyl)-4H-s-triazolo-[4,3-a][1,3,4]benzotriazepine
8-chloro-1-[(diethylamino)methyl]-6-(2,6-difluorophenyl)-4H-s-triazolo[4,3-a][1,3,4]benzotriazepine
1-[(dimethylamino)methyl]-6-phenyl-4H-s-triazolo[4,3-a]-[1,3,4]benzotriazepine
8-chloro-1-[(methylamino)methyl]-6-phenyl-4H-s-triazolo-[4,3-a][1,3,4]benzotriazepine
8-chloro-1-[(methylamino)methyl]-6-(o-chlorophenyl)-4H-s-triazolo[4,3-a][1,3,4]benzotriazepine
1-[(methylamino)methyl]-6-(o-chlorophenyl)-4H-s-triazolo-[4,3-a][1,3,4]benzotriazepine
8-chloro-1-[(methylamino)methyl]-6-(2,6-difluorophenyl)-4H-s-triazolo[4,3-a][1,3,4]benzotriazepine
1-[(methylamino)methyl]-6-phenyl-4H-s-triazolo[4,3-a]-[1,3,4]benzotriazepine
and the like.

Treatment of the compounds of formula IV (including IV A, IV B, IV C, IV D, and IV E) with a pharmacologically acceptable acid such as hydrochloric, hydrobromic, phosphoric, sulfuric, acetic, propionic, toluenesulfonic, naphthalene-β-sulfonic, methanesulfonic, tartaric, citric, lactic, malic, maleic, or cyclohexanesulfamic acid produces the pharmacologically acceptable salts of these compounds of formula III. The salts can be used for the same purposes as the free base compounds of formula IV C.

Salt formation is achieved in conventional manner by reacting the compounds of formula VI C with an excess of a selected acid in a suitable medium e.g., water, alkanol, ether, or acetone and recovering the sale by evaporating the solvent, preferably in vacuo.

I claim:
1. A compound of the formula

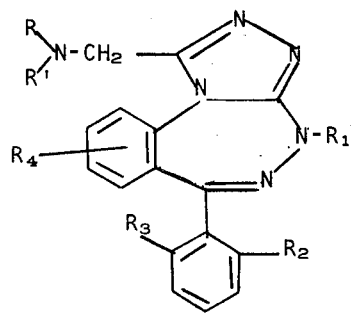

wherein R is hydrogen or alkyl of 1 to 3 carbon atoms inclusive; wherein R' is alkyl as defined above, or together

is pyrrolidino, piperidino, morpholino or 4-methylpiperazino; wherein $R_1$ is hydrogen or alkyl defined as above; wherein $R_2$ and $R_3$ are hydrogen, chloro or fluoro, and wherein $R_4$ is hydrogen, chloro or nitro, and the pharmacologically acceptable acid addition salts thereof.

2. A compound of the formula IV D;

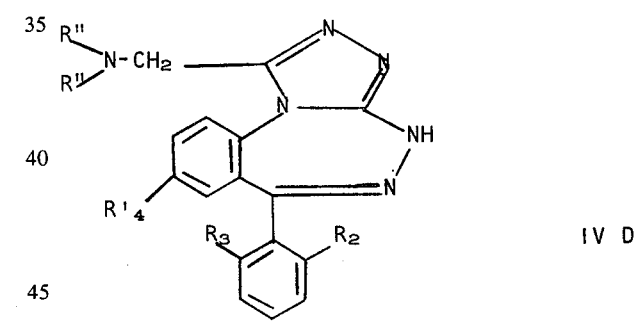

IV D wherein R'' is alkyl of 1 to 3 carbon atoms, inclusive; wherein $R_2$ and $R_3$ are hydrogen, chloro or fluoro, and wherein $R'_4$ is chloro or nitro; and the pharmacologically acceptable acid addition salts thereof.

3. A compound of the formula IV E

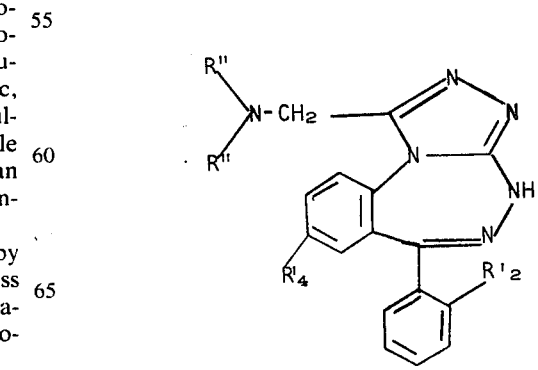

wherein R'' is alkyl of 1 to 3 carbon atoms, inclusive; wherein R'₄ is chloro or nitro; and wherein R'₂ is hydrogen or chloro, and the pharmacologically acceptable acid addition salts thereof.

4. A compound according to claim 3, wherein R'' is methyl, R'₂ is hydrogen, R'₄ is chloro, and the compound is therefore 8-chloro-1-[(dimethylamino)methyl]-6-phenyl-4H-s-triazolo[4,3-a][1,3,4]benzotriazepine.

5. A compound according to claim 3 wherein R'' is methyl, R'₂ and R'₄ are chloro, and the compound is therefore 8-chloro-1-[(dimethylamino)methyl]-6-(o-chlorophenyl)-4H-s-triazolo[4,3-a][1,3,4]benzotriazepine.

6. A compound according to claim 1 wherein R, R' and R₁ are methyl, R₂ and R₃ are hydrogen, R₄ is chloro, and the compound is therefore 8-chloro-1-[(dimethylamino)methyl]-4-methyl-6-phenyl-4H-s-triazolo[4,3-a][1,3,4]benzotriazepine.

7. A compound according to claim 3, wherein R'' is methyl, R'₂ is hydrogen, R'₄ is nitro, and the compound is therefore 8-nitro-1-[(dimethylamino)methyl]-6-phenyl-4H-s-triazolo[4,3-a][1,3,4]benzotriazepine.

8. A process for the production of a compound of Formula IV A:

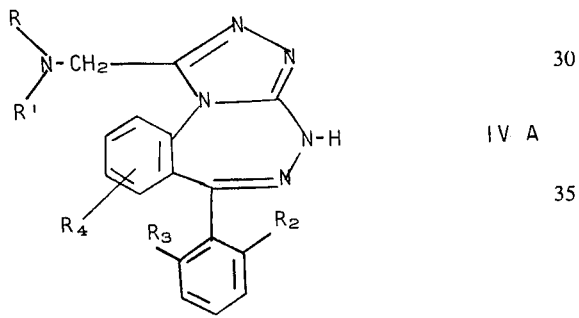

IV A wherein R is hydrogen or alkyl of 1 to 3 carbon atoms, inclusive; wherein R' is alkyl as defined above, or together

is pyrrolidino, piperdino, morpholino or 4-methylpiperazino; wherein R₂ and R₃ are hydrogen, chloro or fluoro, and wherein R₄ is hydrogen, chloro or nitro, which comprises:

heating a compound of the formula I:

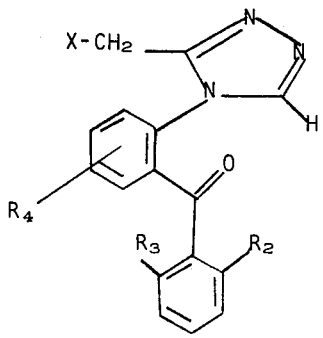

wherein X is chloro or bromo and R₂, R₃ and R₄ are defined as hereinabove, with an N-bromo or N-chloro acid amide or acid imide to obtain a compound of formula II:

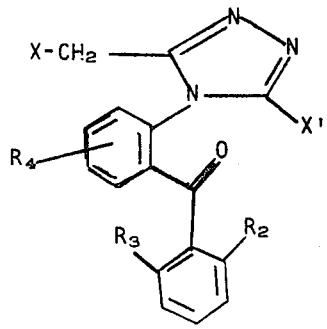

II wherein X' is chloro or bromo, and X, R₂, R₃ and R₄ are defined as above; treating the compound of formula II with a primary or secondary amine of the formula

wherein R and R' or

are defined as above to obtain Compound III:

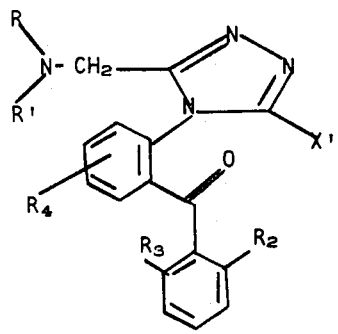

III wherein X', R, R', R₂, R₃ and R₄ are defined as above; heating compound III with anhydrous hydrazine or a hydrazine salt and a base, between 70° to 120°C, to obtain the compound of formula IV A above.

9. The process of claim 8 wherein the end product of formula IV A is heated with a strong base and then treated with an alkyl bromide or iodide in which alkyl is of 1 to 3 carbon atoms, inclusive, to obtain a compound of formula IV B:

IV B
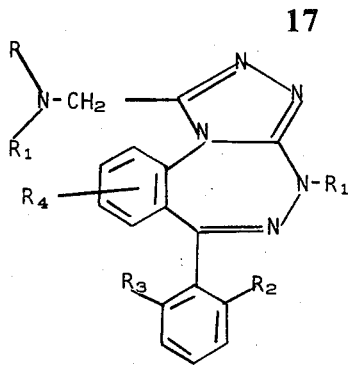
wherein $R_1$ is alkyl of 1 to 3 carbon atoms, inclusive; wherein R is hydrogen or alkyl of 1 to 3 carbon atoms, inclusive; wherein $R'$ is alkyl as defined above; or together
$$-N\begin{matrix}R\\R'\end{matrix}$$
is pyrrolidino, piperdino, morpholino or 4-methylpiperazino; wherein $R_2$ and $R_3$ are hydrogen, chloro or fluoro; and wherein $R_4$ is hydrogen, chloro, or nitro.
* * * * *

UNITED STATES PATENT OFFICE
CERTIFICATE OF CORRECTION

PATENT NO. : 3,880,878
DATED : April 29, 1975
INVENTOR(S) : Jackson B. Hester, Jr.

It is certified that error appears in the above-identified patent and that said Letters Patent are hereby corrected as shown below:

Title, "[4,3" should read --[4,3-a]--. Column 1, line 2, "4,3-" should read -- [4,3-a]--. Column 3, line 5, "heating of" should read --heating to--. Column 5, line 42, "phenykquinazoline" should read --phenylquinazoline--. Column 9, lines 25-34,
"A solution of 8-chloro-1-[(dimethylamino)methyl]-6-phenyl-4H-s-triazolo[4,3-a][1,3,4]benzotriazepine (0.001 mole) in dimethyl-formanide (stirred
Found: C, 61.34; H, 4.90; Cl, 10.19; N, 24.05.
EXAMPLE 4
8-chloro-1-[dimethylamino)methyl]-4-methyl-6-phenyl-4H-s-triazolo-[4,3-a][1,3,4]benzotriazpine (0.001 mole) in dimethylformamide" should read --Found: C, 61.34; H, 4.90; Cl, 10.19; N, 24.05.
Example 4  8-chloro-1-[dimethylamino)methyl]-4-methyl-6-phenyl-4H-s-triazolo[4,3-a][1,3,4]benzotriazepine
A solution of 8-chloro-1-[(dimethylamino)methyl]-6-phenyl-4H-s-triazolo[4,3-a][1,3,4]benzotriazepine (0.001 mole) in dimethyl-formamide--. Column 9, line 36, "sirred" should read --stirred--. Column 12, line 28, "vl)" should read --yl)--; line 36, "(piperidono-" should read --(piperidino--; line 42, "(piperidono-" should read --(piperidino--; line 63, "benezephenone" should read --benzophenone--.

Signed and Sealed this

Fourteenth Day of September 1976

[SEAL]

Attest:

RUTH C. MASON
Attesting Officer

C. MARSHALL DANN
Commissioner of Patents and Trademarks